(12) United States Patent
Zhao et al.

(10) Patent No.: US 11,910,335 B2
(45) Date of Patent: Feb. 20, 2024

(54) VEHICLE-TO-EVERYTHING SYNCHRONIZATION METHOD AND DEVICE

(71) Applicant: Beijing Xiaomi Mobile Software Co., Ltd., Beijing (CN)

(72) Inventors: Qun Zhao, Beijing (CN); Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 467 days.

(21) Appl. No.: 17/266,358

(22) PCT Filed: Aug. 6, 2018

(86) PCT No.: PCT/CN2018/099012
§ 371 (c)(1),
(2) Date: Feb. 5, 2021

(87) PCT Pub. No.: WO2020/029026
PCT Pub. Date: Feb. 13, 2020

(65) Prior Publication Data
US 2021/0321345 A1 Oct. 14, 2021

(51) Int. Cl.
*H04W 4/44* (2018.01)
*H04W 56/00* (2009.01)
(Continued)

(52) U.S. Cl.
CPC ......... *H04W 56/001* (2013.01); *G01S 19/256* (2013.01); *H04W 4/40* (2018.02);
(Continued)

(58) Field of Classification Search
CPC ..... G01S 19/256; H04W 4/40; H04W 56/001; H04W 56/0015; H04W 56/002;
(Continued)

(56) References Cited

U.S. PATENT DOCUMENTS 10,299,180 B2  5/2019  Hong et al.
10,820,288 B2 * 10/2020  Li .................... H04J 3/0638
(Continued)

FOREIGN PATENT DOCUMENTS

CN    103686985 A   3/2014
CN    103828398 A   5/2014
(Continued)

OTHER PUBLICATIONS

Office Communication in European Application No. 18929426.7, dated Nov. 14, 2022, 7 pages.
(Continued)

*Primary Examiner* — Phuc H Tran
(74) *Attorney, Agent, or Firm* — Finnegan, Henderson, Farabow, Garrett & Dunner, L.L.P.

(57) ABSTRACT

Provided are a vehicle-to-everything synchronization method and device. The method is used for a first terminal, wherein the first terminal can simultaneously support first-type vehicle-to-everything direct communication and second-type vehicle-to-everything direct communication. The method includes: receiving at least one first synchronization signal, wherein the at least one first synchronization signal is a synchronization signal for the first-type vehicle-to-everything direct communication and/or the second-type vehicle-to-everything direct communication; determining a synchronization reference signal for the second-type vehicle-to-everything direct communication according to the first synchronization signal; and performing the second-type vehicle-to-everything direct communication according to the synchronization reference signal. Therefore, according to the present disclosure, a synchronization signal of one type of network can be used to provide a synchronization reference signal for another type of network communication,
(Continued)

and the synchronization efficiency of vehicle-to-everything can also be realized.

19 Claims, 17 Drawing Sheets

(51) Int. Cl.
    *H04W 4/40*     (2018.01)
    *G01S 19/25*     (2010.01)
    *H04W 72/02*     (2009.01)
    *H04W 72/0446*     (2023.01)
    *H04W 72/0453*     (2023.01)

(52) U.S. Cl.
    CPC ......... *H04W 56/006* (2013.01); *H04W 72/02* (2013.01); *H04W 72/0446* (2013.01); *H04W 72/0453* (2013.01)

(58) Field of Classification Search
    CPC ............... H04W 56/006; H04W 72/02; H04W 72/0446; H04W 72/0453; H04W 76/14
    See application file for complete search history.

(56) References Cited

U.S. PATENT DOCUMENTS

| | | | |
|---|---|---|---|
| 11,032,049 B2* | 6/2021 | Zhang | H04L 5/0053 |
| 2017/0215119 A1* | 7/2017 | Hong | H04L 67/12 |
| 2017/0280406 A1 | 9/2017 | Sheng | |
| 2017/0289935 A1 | 10/2017 | Yoon | |
| 2017/0332213 A1 | 11/2017 | Xu et al. | |
| 2017/0367059 A1 | 12/2017 | Park et al. | |
| 2018/0049235 A1 | 2/2018 | Baghel et al. | |
| 2018/0213500 A1 | 7/2018 | Li et al. | |
| 2018/0220388 A1 | 8/2018 | Chae et al. | |
| 2019/0045469 A1 | 2/2019 | Zhang et al. | |
| 2020/0296678 A1 | 9/2020 | Zhang et al. | |
| 2021/0014817 A1 | 1/2021 | Li et al. | |
| 2022/0330266 A1* | 10/2022 | Huang | H04W 72/56 |

FOREIGN PATENT DOCUMENTS

| | | |
|---|---|---|
| CN | 106998575 A | 8/2017 |
| CN | 107027166 A | 8/2017 |
| CN | 107046461 A | 8/2017 |
| CN | 107295626 A | 10/2017 |
| CN | 107689850 A | 2/2018 |
| CN | 107734557 A | 2/2018 |
| CN | 107852685 A | 3/2018 |
| CN | 108141340 A | 6/2018 |
| EP | 3 340 699 A1 | 6/2018 |
| KR | 20170053573 A | 5/2017 |
| WO | WO 2014048306 A1 | 4/2014 |
| WO | WO 2016/182292 A | 11/2016 |
| WO | WO 2017/135650 A1 | 8/2017 |
| WO | WO 2017/171521 A1 | 10/2017 |

OTHER PUBLICATIONS

International Search Report in International Application No. PCT/CN2018/099012, dated Apr. 11, 2019.
Written Opinion of the International Search Authority in the International Application No. PCT/CN2018/099012, dated Apr. 11, 2019.
Huawei et al., Discussion on synchronization support for carrier aggregation of R15 sidelink, 3GPP TSG RAN WG1 Meeting #90, R1-1712131, Prague, Czech Republic, Aug. 21-25, 2017, 3 pages.
LG Electronics, V2X SR for RAN_74, 3GPP TSG RAN meeting #74 RP-162553, Vienna, Austria, Dec. 5-8, 2016, 27 pages.
Notification to Grant Patent Right for Invention for Chinese Application No. 201880001650.4, dated Jul. 2, 2021.
Wang, Qingyang, et al., "Key technology and standardization progress for 5G", Guangzhou Research Institute of China Telecom Co., Ltd., Guangzhou 510630, China, Aug. 7, 2017, 11 pages.
Huawei, HiSilicon, "Discussion on Mod 3 support for carrier aggregation of R15 sidelink", 3GPP TSG RAN WG1 Meeting #90 R1-1712137, Prague, Czech Republic, Aug. 21-25, 2017, 2 pages.
Examination Report for Indian application No. 202147009162, dated Jan. 27, 2022.
Intel Corporation, "Synchronization Aspects for V2V/V2X Communication", 3GPP TSG RAN WG1 Meeting #83 R1-156539, Anaheim, USA, Nov. 15-22, 2015, 7 pages.
Extended European Search Report in European Application No. 18929426.7, dated Feb. 14, 2022.

* cited by examiner

VEHICLE-TO-EVERYTHING SYNCHRONIZATION METHOD AND DEVICE

CROSS REFERENCE TO RELATED APPLICATIONS

This application is a national phase application based on International Application No. PCT/CN2018/099012, filed Aug. 6, 2018, the content of which is incorporated herein by reference.

TECHNICAL FIELD

The present disclosure generally relates to the communication technology, and particularly, to a method and device for vehicle-to-everything (V2X) synchronization.

BACKGROUND

V2X communication may include vehicle to vehicle (V2V) communication, vehicle to infrastructure (V2I) communication, vehicle to pedestrian (V2P) communication and the like. In the conventional art, V2X communication may be supported by the existing cellular communication technology, namely the communication is implemented by use of a communication link between a terminal device and a base station in an existing cellular network. However, Long Term Evolution (LTE) V2X communication merely supports a few basic V2X applications on security. Therefore, for supporting new V2X services and meeting new V2X technical requirements, New Radio (NR) V2X communication is required to provide a higher communication rate, a shorter communication delay and more reliable communication quality.

SUMMARY

For solving the problem in the related art, embodiments of the present disclosure provide a method and device for V2X synchronization.

According to a first aspect of the embodiments of the present disclosure, a method for V2X synchronization is provided, which may be applied to a first terminal, the first terminal supporting both a first-type V2X direct communication and a second-type V2X direct communication, the method including:
  receiving at least one first synchronization signal, wherein the at least one first synchronization signal comprises one or more synchronization signals for at least one of the first-type V2X direct communication and the second-type V2X direct communication;
  determining a synchronization reference signal for the second-type V2X direct communication according to the at least one first synchronization signal; and
  performing the second-type V2X direct communication according to the synchronization reference signal.

Optionally, the at least one first synchronization signal may include at least one of:
  a second synchronization signal representing a synchronization signal sent by a global navigation satellite system (GNSS);
  a third synchronization signal representing a downlink synchronization signal sent by a first-type base station;
  a fourth synchronization signal representing a synchronization signal for first-type V2X direct communication sent by a second terminal;
  a fifth synchronization signal representing a downlink synchronization signal sent by a second-type base station; or
  a sixth synchronization signal representing a synchronization signal for second-type V2X direct communication sent by a third terminal.

Optionally, the operation of determining the synchronization reference signal for the second-type V2X direct communication according to the at least one first synchronization signal may include:
  if the at least one first synchronization signal consists of one first synchronization signal, determining the first synchronization signal to be the synchronization reference signal; and
  if the at least one first synchronization signal consists of multiple first synchronization signals, determining the synchronization reference signal from the first synchronization signals according to a first set rule.

Optionally, the first set rule may include a specified priority order corresponding to specified synchronization signals; and
  the operation of determining the synchronization reference signal from the first synchronization signals according to the first set rule may include:
  determining a first priority order corresponding to the first synchronization signals according to the specified priority order, and
  determining one of the first synchronization signals corresponding to a highest priority in the first priority order to be the synchronization reference signal.

Optionally, the first set rule may include a first set priority order and a second set priority order corresponding to specified synchronization signals, a first set condition corresponding to the first set priority order and a second set condition corresponding to the second set priority order, and
  the operation of determining the synchronization reference signal from the first synchronization signals according to the first set rule may include:
  if it is detected that the first set condition is met, determining a second priority order corresponding to the first synchronization signal according to the first set priority order, and determining one of the first synchronization signals corresponding to a highest priority in the second priority order to be the synchronization reference signal; and
  if it is detected that the second set condition is met, determining a third priority order corresponding to the first synchronization signal according to the second set priority order, and determining one of the first synchronization signals corresponding to a highest priority in the third priority order to be the synchronization reference signal.

Optionally, the first set condition may include that the first terminal is out of a coverage of a base station or that the first terminal is out of the coverage of the base station and the base station instructs the first terminal through downlink control signaling to use the first set priority order; and
  the second set condition may include that the first terminal is in the coverage of the base station and the base station instructs the first terminal through the downlink control signaling to use the second set priority order.

Optionally, the operation of performing the second-type V2X direct communication according to the synchronization reference signal may include:
  sending second-type V2X control signaling and/or data according to the synchronization reference signal.

Optionally, the method may further include:
  determining a first specified signal to be broadcast according to a second set rule, the specified signal comprising at least one of a first signal or a second signal, wherein the first signal comprises a first-type V2X synchronization signal and/or broadcast message, and the second signal comprises a second-type V2X synchronization signal and/or broadcast message; and
  broadcast the first specified signal.

Optionally, the second set rule may be pre-configured by the first terminal, or the second set rule may be indicated by the base station through the downlink control signaling to be used by the first terminal.

Optionally, the method may further include:
  determining a second specified signal to be broadcast, the second specified signal comprising at least one of a third signal or a fourth signal, wherein the third signal comprises a second-type V2X synchronization signal and/or broadcast message compatible with the first-type V2X synchronization signal and/or broadcast message, and the fourth signal comprises a second-type V2X synchronization signal and/or broadcast message incompatible with the first-type V2X synchronization signal and/or broadcast message; and
  broadcasting the second specified signal on a specified time-frequency resource.

Optionally, the specified time-frequency resource may include a first time-frequency resource subset and a second time-frequency resource subset, wherein the first time-frequency resource subset comprises a time-frequency resource for transmitting the third signal, and the second time-frequency resource subset comprises a time-frequency resource for transmitting the fourth signal; and
  the operation of broadcasting the second specified signal on the specified time-frequency resource may include:
  broadcasting the second specified signal by use of the first time-frequency resource subset and the second time-frequency resource subset.

Optionally, the second specified signal may include a second-type V2X broadcast message, and
  the operation of broadcasting the second specified signal by use of the first time-frequency resource subset and the second time-frequency resource subset may include:
  dividing the second-type V2X broadcast message into a first information subset and a second information subset, wherein the first information subset represents information that can be carried in a physical sidelink broadcast channel (PSBCH) in the first time-frequency resource subset, and the second information subset represents information that cannot be carried in the PSBCH in the first time-frequency resource subset;
  broadcasting the first information subset by use of the first time-frequency resource subset; and
  broadcasting the second information subset by use of the second time-frequency resource subset.

Optionally, before the operation of broadcasting the second specified signal by use of the first time-frequency resource subset and the second time-frequency resource subset, the method may further include:
  determining a V2X type, to which the first device belongs, the V2X type comprising first-type V2X or second-type V2X;
  generating indication information, the indication information representing the V2X type; and
  adding the indication information to a specified position in the PSBCH in the first time-frequency resource subset.

Optionally, the specified position may be at a reserved bit specified to indicate the V2X type in the PSBCH.

Optionally, a first type may be an LTE cellular network, and a second type may be an NR cellular network.

According to a second aspect of the embodiments of the present disclosure, a device for V2X synchronization is provided, which may be applied to a first terminal, the first terminal supporting both first-type V2X direct communication and second-type V2X direct communication, the device including:
  a receiving module, configured to receive at least one first synchronization signal, wherein the at least one first synchronization signal comprises one or more synchronization signals for at least one of the first-type V2X direct communication or the second-type V2X direct communication;
  a first determination module, configured to determine a synchronization reference signal for second-type V2X direct communication according to the first synchronization signal; and
  a processing module, configured to perform second-type V2X direct communication according to the synchronization reference signal.

Optionally, the at least one first synchronization signal may include at least one of:
  a second synchronization signal representing a synchronization signal sent by a global navigation satellite system (GNSS);
  a third synchronization signal representing a downlink synchronization signal sent by a first-type base station;
  a fourth synchronization signal representing a synchronization signal for first-type V2X direct communication sent by a second terminal;
  a fifth synchronization signal representing a downlink synchronization signal sent by a second-type base station; or
  a sixth synchronization signal representing a synchronization signal for second-type V2X direct communication sent by a third terminal.

Optionally, the first determination module may include:
  a first determination submodule, configured to, if the at least one first synchronization signal consists of one first synchronization signal, determine the first synchronization signal to be the synchronization reference signal; and
  a second determination submodule, configured to, if the at least one first synchronization signal consists of multiple first synchronization signals, determine the synchronization reference signal from the first synchronization signals according to a first set rule.

Optionally, the first set rule may include a specified priority order corresponding to specified synchronization signals; and the second determination submodule may include:
  a third determination submodule, configured to determine a first priority order corresponding to the first synchronization signal according to the specified priority order, and
  a fourth determination submodule, configured to determine one of the first synchronization signals corresponding to a highest priority in the first priority order to be the synchronization reference signal.

Optionally, the first set rule may include a first set priority order and a second set priority order corresponding to specified synchronization signals, a first set condition corresponding to the first set priority order and a second set condition corresponding to the second set priority order; and the second determination submodule may include:
- a fifth determination submodule, configured to, if it is detected that the first set condition is met, determine a second priority order corresponding to the first synchronization signal according to the first set priority order and determine one of the first synchronization signals corresponding to a highest priority in the second priority order to be the synchronization reference signal, and
- a sixth determination submodule, configured to, if it is detected that the second set condition is met, determine a third priority order corresponding to the first synchronization signal according to the second set priority order and determine one of the first synchronization signals corresponding to a highest priority in the third priority order to be the synchronization reference signal.

Optionally, the first set condition may include that the first terminal is out of a coverage of a base station or that the first terminal is out of the coverage of the base station and the base station instructs the first terminal through downlink control signaling to use the first set priority order; and
the second set condition may include that the first terminal is in the coverage of the base station and the base station instructs the first terminal through the downlink control signaling to use the second set priority order.

Optionally, the processing module may include:
a processing submodule, configured to send second-type V2X control signaling and/or data according to the synchronization reference signal.

Optionally, the device may further include:
a second determination module, configured to determine a first specified signal to be broadcast according to a second set rule, the specified signal comprising a first signal and/or a second signal, wherein the first signal comprises a first-type V2X synchronization signal and/or broadcast message, and the second signal comprises a second-type V2X synchronization signal and/or broadcast message; and
a first transmission module, configured to broadcast the first specified signal.

Optionally, the second set rule may be pre-configured by the first terminal, or the second set rule is indicated by the base station through the downlink control signaling to be used by the first terminal.

Optionally, the device may further include:
a third determination module, configured to determine a second specified signal to be broadcast, the second specified signal comprising at least one of a third signal or a fourth signal, wherein the third signal comprises a second-type V2X synchronization signal and/or broadcast message compatible with the first-type V2X synchronization signal and/or broadcast message, and the fourth signal comprises a second-type V2X synchronization signal and/or broadcast message incompatible with the first-type V2X synchronization signal and/or broadcast message; and
a second transmission module, configured to broadcast the second specified signal on a specified time-frequency resource.

Optionally, the specified time-frequency resource may include a first time-frequency resource subset and a second time-frequency resource subset, wherein the first time-frequency resource subset comprises a time-frequency resource for transmitting the third signal, and the second time-frequency resource subset comprises a time-frequency resource for transmitting the fourth signal; and
the second transmission module may include:
a first transmission submodule, configured to broadcast the second specified signal by use of the first time-frequency resource subset and the second time-frequency resource subset.

Optionally, the second specified signal may include a second-type V2X broadcast message; and the first transmission submodule may include:
- a division submodule, configured to divide the second-type V2X broadcast message into a first information subset and a second information subset, wherein the first information subset represents information that can be carried in a physical sidelink broadcast channel (PSBCH) in the first time-frequency resource subset, and the second information subset represents information that cannot be carried in the PSBCH in the first time-frequency resource subset,
- a second transmission submodule, configured to broadcast the first information subset by use of the first time-frequency resource subset, and
- a third transmission submodule, configured to broadcast the second information subset by use of the second time-frequency resource subset.

Optionally, the second transmission module may further include:
- a seventh determination submodule, configured to determine a V2X type, to which the first device belongs, the V2X type comprising first-type V2X or second-type V2X;
- a generation submodule, configured to generate indication information representing the V2X type; and
- an addition submodule, configured to add the indication information to a specified position in the PSBCH in the first time-frequency resource subset.

Optionally, the specified position may be at a reserved bit specified to indicate the V2X type in the PSBCH.

Optionally, a first type may be an LTE cellular network, and a second type may be an NR cellular network.

According to a third aspect of the embodiments of the present disclosure, a non-transitory computer-readable storage medium is provided, in which a computer program may be stored, wherein the computer program may be configured to execute the method for V2X synchronization as described in the first aspect.

According to a fourth aspect of the embodiments of the present disclosure, a device for V2X synchronization is provided, which may be applied to a first terminal, the first terminal supporting both first-type V2X direct communication and second-type V2X direct communication, the device including:
a processor; and
a memory configured to store instructions executable by the processor,
wherein the processor may be configured to:
receive at least one first synchronization signal, wherein the at least one first synchronization signal comprises one or more synchronization signals for at least one of the first-type V2X direct communication or the second-type V2X direct communication;
determine a synchronization reference signal for the second-type V2X direct communication according to the at least one first synchronization signal; and
perform the second-type V2X direct communication according to the synchronization reference signal.

The technical solutions provided in the embodiments of the present disclosure may have the following beneficial effects.

In the present disclosure, the first terminal, when receiving at least one first synchronization signal, the first synchronization signal being a synchronization signal for first-type V2X direct communication and/or second-type V2X direct communication, may determine the synchronization reference signal for second-type V2X direct communication according to the first synchronization signal and perform the second-type V2X direct communication according to the synchronization reference signal, thereby enabling provision of a synchronization reference signal for communication of a network of one type by use of a synchronization signal of a network of another type, and improving the V2X synchronization efficiency.

It should be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only used for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It should also be understood that term "and/or" used in the present disclosure refers to and includes one or any or all possible combinations of multiple associated items that are listed.

It should be understood that, although the terms first, second, third and the like may be used to describe various information in the present disclosure, the information should not be limited to these terms. These terms are only used to distinguish the information of the same type. For example, without departing from the scope of the present disclosure, indication information may also be called second information and, similarly, second information may also be called indication information. For example, the term "if" used here may be explained as "while" or "when" or "responsive to determining", which depends on the context.

Figure 1:
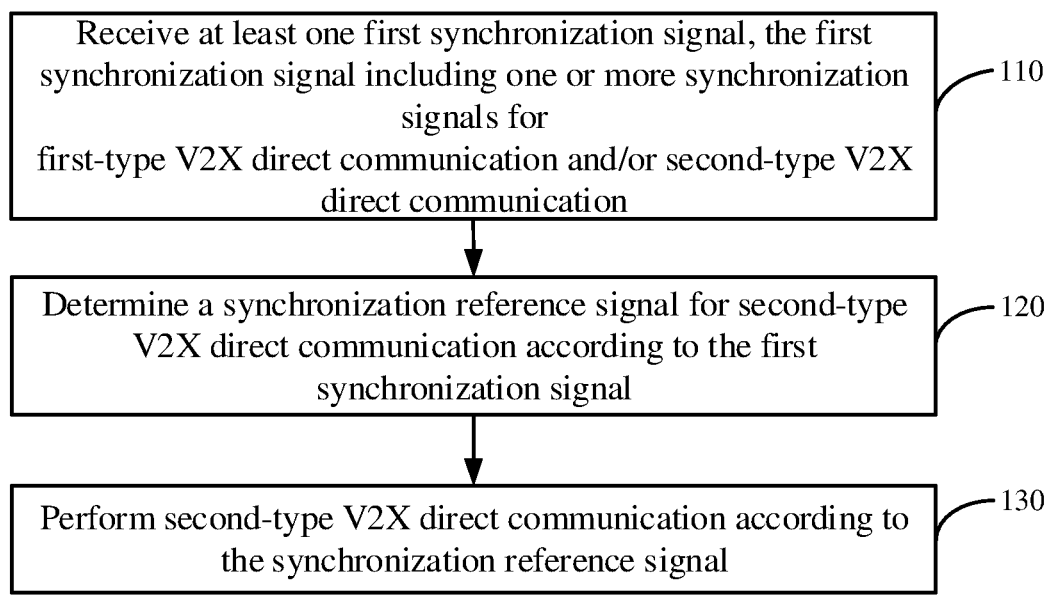
FIG. 1 is a flow chart showing a method for V2X synchronization, according to an exemplary embodiment.
Figure 2:
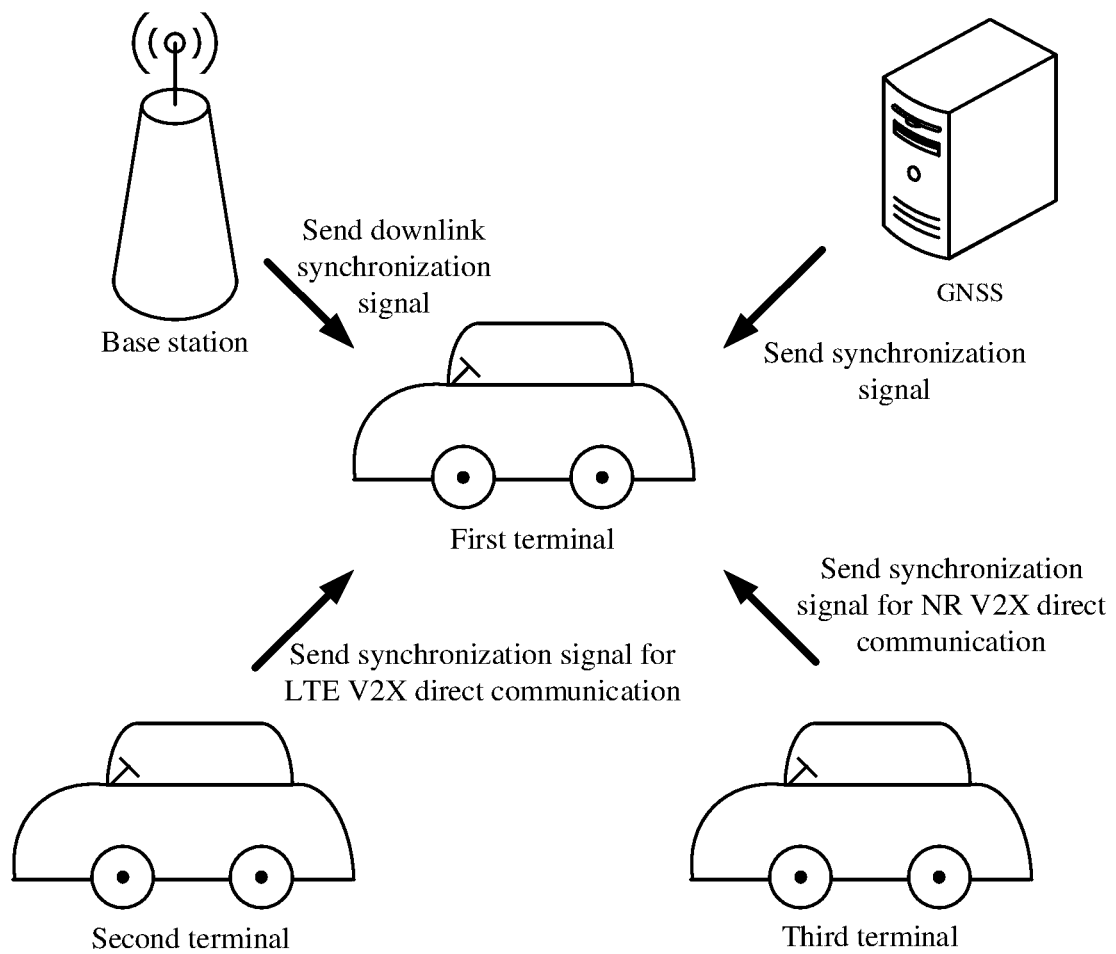
FIG. 2 is a diagram of an application scenario of a method for V2X synchronization, according to an exemplary embodiment.

FIG. 1 is a flow chart showing a method for V2X synchronization, according to an exemplary embodiment. FIG. 2 is a diagram of an application scenario of a method for V2X synchronization, according to an exemplary embodiment. The method for V2X synchronization may be applied to a first terminal. The first terminal supports both a first-type V2X direct communication and a second-type V2X direct communication. For example, a first type is an LTE cellular network, and a second type is an NR cellular network. As shown in FIG. 1, the method for V2X synchronization may include the following Steps 110 to 130.

In Step 110, at least one first synchronization signal is received. The at least one first synchronization signal includes one or more synchronization signals for first-type V2X direct communication and/or second-type V2X direct communication.

In the embodiment of the present disclosure, the first synchronization signal represents a synchronization signal received by the first terminal. The first synchronization signal may be a synchronization signal sent by a Global Navigation Satellite System (GNSS), for example, a synchronization signal sent by a Global Positioning System (GPS) or the Beidou; or the first synchronization signal may be a downlink synchronization signal sent by a base station, for example, a downlink synchronization signal sent by a base station of the LTE cellular network or a downlink synchronization signal sent by a base station of the NR cellular network; or the first synchronization signal may be a direct communication synchronization signal broadcast by another terminal, for example, a synchronization signal for LTE cellular network V2X direct communication or a synchronization signal for NR cellular network V2X communication sent by another terminal.

In an embodiment, the at least one first synchronization signal in Step 110 may include, but not limited to, at least one of:

(1-1) a second synchronization signal representing a synchronization signal sent by a GNSS;

(1-2) a third synchronization signal representing a downlink synchronization signal sent by a first-type base station;

(1-3) a fourth synchronization signal representing a synchronization signal for first-type V2X direct communication sent by a second terminal;

(1-4) a fifth synchronization signal representing a downlink synchronization signal sent by a second-type base station; or (1-5) a sixth synchronization signal representing a synchronization signal for second-type V2X direct communication sent by a third terminal.

The synchronization signal sent by the GNSS in (1-1) may be determined to be a first-type V2X synchronization signal or may be determined to be a second-type V2X synchronization signal. The downlink synchronization signal sent by the first-type base station in (1-2) may be determined to be a first-type V2X synchronization signal. The downlink synchronization signal sent by the second-type base station in (1-4) may be determined to be a second-type V2X synchronization signal. The first type may be the LTE cellular network, and the second type may be the NR cellular network.

In Step 120, a synchronization reference signal for the second-type V2X direct communication is determined according to the at least one first synchronization signal.

In the embodiment of the present disclosure, the synchronization reference signal may be one of the at least one first synchronization signal. The synchronization reference signal may be determined in a manner corresponding to the number of the at least one first synchronization signal. A specific implementation process may refer to an embodiment shown in FIG. 3.

In Step 130, the second-type V2X direct communication is performed according to the synchronization reference signal.

In the embodiment of the present disclosure, frequency synchronization and time synchronization may be performed according to the synchronization reference signal.

In an embodiment, Step 130 may include the following operations.

(2-1) Second-type V2X (for example, NR V2X) control signaling and/or data are/is sent according to the synchronization reference signal.

For example, if the synchronization reference signal is a downlink synchronization signal sent by an LTE base station, the downlink synchronization signal may be determined to be a synchronization reference signal for sending NR V2X control signaling and/or data, and the NR V2X control signaling and/or data are/is sent according to the synchronization reference signal.

For another example, if the synchronization reference signal is a synchronization signal for LTE V2X direct communication sent by an LTE V2X terminal, the synchronization signal for LTE V2X direct communication may be determined to be a synchronization reference signal for sending the NR V2X control signaling and/or data, and the NR V2X control signaling and/or data are/is sent according to the synchronization reference signal.

In an exemplary scenario, as shown in FIG. 2, a first terminal receives multiple first synchronization signals, i.e., a synchronization signal sent by a GNSS, a downlink synchronization signal sent by a base station, a synchronization signal for LTE V2X direct communication sent by a second terminal, and a synchronization signal for NR V2X direct communication sent by a third terminal. In this case, the first terminal may determine a synchronization reference signal for second-type V2X (for example, NR V2X) direct communication according to these first synchronization signals and perform second-type V2X direct communication according to the synchronization reference signal. For example, if the synchronization reference signal determined by the first terminal is the synchronization signal sent by the GNSS, second-type V2X (for example, NR V2X) direct communication may be performed according to the synchronization signal sent by the GNSS.

It can be seen from the embodiment that, when the at least one first synchronization signal is received, the first synchronization signal being a synchronization signal for first-type V2X direct communication and/or second-type V2X direct communication, the synchronization reference signal for second-type V2X direct communication may be determined according to the at least one first synchronization signal, and second-type V2X direct communication may be performed according to the synchronization reference signal, thereby providing a synchronization reference signal for communication of a network of one type by use of a synchronization signal of a network of another type, and improving the V2X synchronization efficiency.

Figure 3:
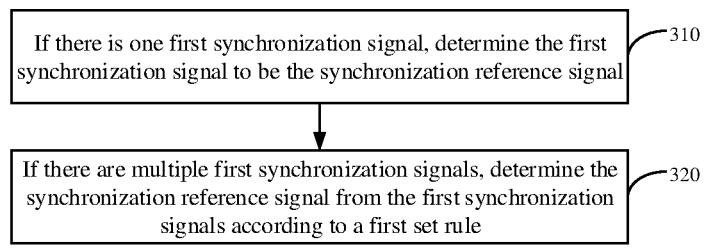
FIG. 3 is a flow chart showing another method for V2X synchronization, according to an exemplary embodiment.

FIG. 3 is a flow chart showing another method for V2X synchronization, according to an exemplary embodiment. The method for V2X synchronization may be applied to the first terminal and is based on the method shown in FIG. 1. As shown in FIG. 3, Step 120 may include the following Steps 310 to 320.

In Step 310, if the at least one first synchronization signal consists of one first synchronization signal, the first synchronization signal is determined to be the synchronization reference signal.

In Step 320, if the at least one first synchronization signal consists of multiple first synchronization signals, the synchronization reference signal is determined from the first synchronization signals according to a first set rule.

In the embodiment of the present disclosure, the first set rule may be pre-configured by the first terminal, or may be indicated by a base station through downlink control signaling to be used by the first terminal.

The operation of determining the synchronization reference signal from the first synchronization signals according to the first set rule may include, but not limited to, the following implementation manners.

A first manner: the first set rule includes a specified priority order corresponding to specified synchronization signals.

In this manner, Step 320 may include the following operations.

(3-1) A first priority order corresponding to the first synchronization signals is determined according to the specified priority order.

(3-2) One of the first synchronization signals corresponding to a highest priority in the first priority order is determined to be the synchronization reference signal.

For example, the specified priority order is: the synchronization signal sent by the GNSS>(namely higher than in priority) the synchronization signal for NR cellular network V2X direct communication>=(namely higher than or equal to in priority) the synchronization signal for LTE cellular network V2X direct communication>(namely higher than in priority) the downlink synchronization signal sent by the base station.

For another example, the specified priority order is: the downlink synchronization signal sent by the base station>(namely higher than in priority) the synchronization signal sent by the GNSS>(namely higher than in priority) the synchronization signal for NR cellular network V2X direct communication>=(namely higher than or equal to in priority) the synchronization signal for LTE cellular network V2X direct communication.

For another example, the specified priority order is: the downlink synchronization signal sent by the base station>(namely higher than in priority) the synchronization signal for NR cellular network V2X direct communication>=(namely higher than or equal to in priority) the synchronization signal for LTE cellular network V2X direct communication>(namely higher than in priority) the synchronization signal sent by the GNSS.

In addition, for the specified priority order in the first manner, an influence of a synchronization reference signal and/or a synchronization source selected by a user terminal that sends a synchronization signal for direct communication may also be considered. For example, the specified priority order is: the synchronization signal sent by the GNSS>(namely higher than in priority) the synchronization signal for NR cellular network V2X direct communication taking the GNSS as a synchronization reference signal/synchronization source>=(namely more than or equal to in priority) the synchronization signal for LTE cellular network V2X direct communication taking the GNSS as a synchronization reference signal/synchronization source>(namely higher than in priority) the downlink synchronization signal sent by the base station>(namely higher than in priority) others.

A second manner: the first set rule includes a first set priority order and second set priority order corresponding to the specified synchronization signals, a first set condition corresponding to the first set priority order, and a second set condition corresponding to the second set priority order.

In this manner, the first terminal detects the condition of itself. Step 320 includes the following operations.

(4-1) If it is detected that the first set condition is met, a second priority order corresponding to the first synchronization signal is determined according to the first set priority order, and one of the first synchronization signals corresponding to a highest priority in the second priority order is determined to be the synchronization reference signal.

(4-2) If it is detected that the second set condition is met, a third priority order corresponding to the first synchronization signal is determined according to the second set priority order, and one of the first synchronization signals corresponding to a highest priority in the third priority order is determined to be the synchronization reference signal.

In an embodiment, the first set condition may include that the first terminal is out of a coverage of the base station; or the first set condition may include that the first terminal is out of the coverage of the base station and the base station instructs the first terminal through the downlink control signaling to use the first set priority order. And the second set rule includes that the first terminal is in the coverage of the base station and the base station instructs the first terminal through the downlink control signaling to use the second set priority order. That is, when the first terminal is out of the coverage of the base station, the second priority order may be used, and when the first terminal is in the coverage of the base station, it is determined whether the second priority order or the third priority order is to be used according to the downlink control signaling of the base station.

For example, the second priority order is: the synchronization signal sent by the GNSS>the synchronization signal for NR cellular network V2X direct communication>the synchronization signal for LTE cellular network V2X direct communication>the downlink synchronization signal sent by the base station; and the third priority order is: the downlink synchronization signal sent by the base station>the synchronization signal sent by the GNSS>the synchronization signal for NR cellular network V2X direct communication>the synchronization signal for LTE cellular network V2X direct communication.

It can be seen from the embodiment that, if the at least one first synchronization signal consists of one first synchronization signal, the first synchronization signal may be directly determined to be the synchronization reference signal, and if the at least one first synchronization signal consists of multiple first synchronization signals, the synchronization reference signal may be determined from the first synchronization signals according to the first set rule. Therefore, the accuracy of determining the synchronization reference signal is improved.

Figure 4:
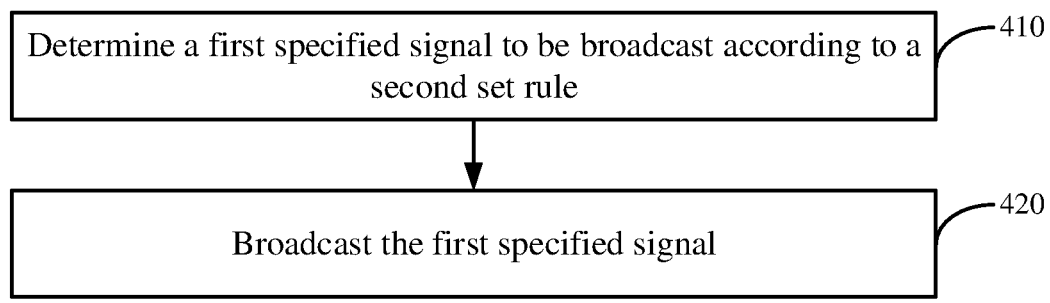
FIG. 4 is a flow chart showing another method for V2X synchronization, according to an exemplary embodiment.

FIG. 4 is a flow chart showing another method for V2X synchronization, according to an exemplary embodiment. The method for V2X synchronization may be applied to a terminal and is based on the method shown in FIG. 1. As shown in FIG. 4, the method for V2X synchronization may further include the following Steps 410 to 420.

In Step 410, a first specified signal to be broadcast is determined according to a second set rule. The specified signal may include a first signal and/or a second signal, the first signal includes a first-type V2X synchronization signal and/or broadcast message, and the second signal includes a second-type V2X synchronization signal and/or broadcast message.

In an embodiment, the second set rule in Step 410 may be pre-configured by the first terminal, or may be indicated by the base station through the downlink control signaling to be used by the first terminal.

The second set rule may specify that a first-type V2X (for example, LTE V2X) synchronization signal and/or broadcast message is to be sent, or may specify that a second-type V2X (for example, NR V2X) synchronization signal and/or broadcast message is to be sent, or may specify that both a first-type V2X (for example, LTE V2X) synchronization signal and/or broadcast message and a second-type V2X (for example, NR V2X) synchronization signal and/or broadcast message are to be sent.

In Step 420, the first specified signal is broadcast.

In the embodiment of the present disclosure, when the first terminal supports both first-type V2X (for example, LTE V2X) direct communication and second-type V2X (for example, NR V2X) direct communication, the first terminal may merely send a first-type V2X (for example, LTE V2X) synchronization signal and/or broadcast message according to the second set rule, or may merely send a second-type V2X (for example, NR V2X) synchronization signal and/or broadcast message according to the second set rule, or may send both a first-type V2X (for example, LTE V2X) synchronization signal and/or broadcast message and a second-type V2X (for example, NR V2X) synchronization signal and/or broadcast message according to the second set rule.

It can be seen from the embodiment that the first specified signal to be broadcast may be determined according to the second set rule, such that the first terminal may merely send a first-type V2X (for example, LTE V2X) synchronization signal and/or broadcast message according to the second set rule, or may merely send a second-type V2X (for example, NR V2X) synchronization signal and/or broadcast message according to the second set rule, or may send both a first-type V2X (for example, LTE V2X) synchronization signal and/or broadcast message and a second-type V2X (for example, NR V2X) synchronization signal and/or broadcast message according to the second set rule. Therefore, the flexibility in V2X synchronization is improved, and the practicability of V2X synchronization is also improved.

Figure 5:
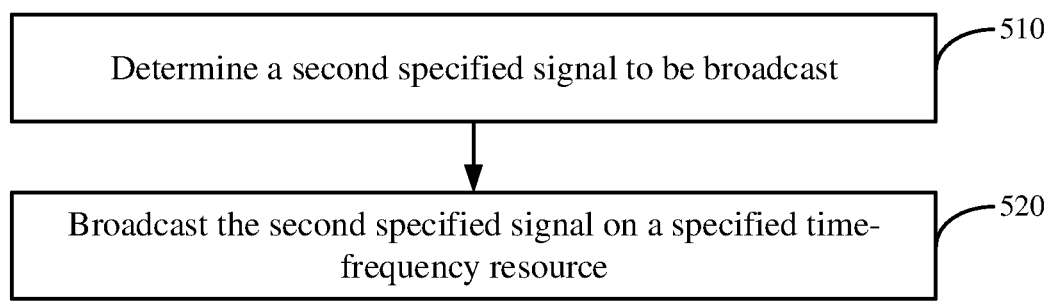
FIG. 5 is a flow chart showing another method for V2X synchronization, according to an exemplary embodiment.

FIG. 5 is a flow chart showing another method for V2X synchronization, according to an exemplary embodiment. The method for V2X synchronization may be applied to a terminal and is based on the method shown in FIG. 1. As shown in FIG. 5, the method for V2X synchronization may further include the following Steps 510 to 520.

In Step 510, a second specified signal to be broadcast is determined. The second specified signal may include a third signal and/or a fourth signal, the third signal includes a second-type V2X (for example, NR V2X) synchronization signal and/or broadcast message compatible with the first-type V2X (for example, LTE V2X) synchronization signal and/or broadcast message, and the fourth signal includes a second-type V2X (for example, NR V2X) synchronization signal and/or broadcast message incompatible with the first-type V2X (for example, LTE V2X) synchronization signal and/or broadcast message. Here, being compatible may mean that LTE V2X user equipment may correctly receive the NR V2X synchronization signal/broadcast message.

In Step 520, the second specified signal is broadcast on a specified time-frequency resource.

In the embodiment of the present disclosure, the specified time-frequency resource is a time-frequency resource for transmitting the second-type V2X (for example, NR V2X) synchronization signal and/or broadcast message.

In an embodiment, the specified time-frequency resource includes a first time-frequency resource subset and a second time-frequency resource subset, the first time-frequency resource subset includes a time-frequency resource for transmitting the third signal, and the second time-frequency resource subset includes a time-frequency resource for transmitting the fourth signal. Step 520 includes the following operations.

Figure 6:
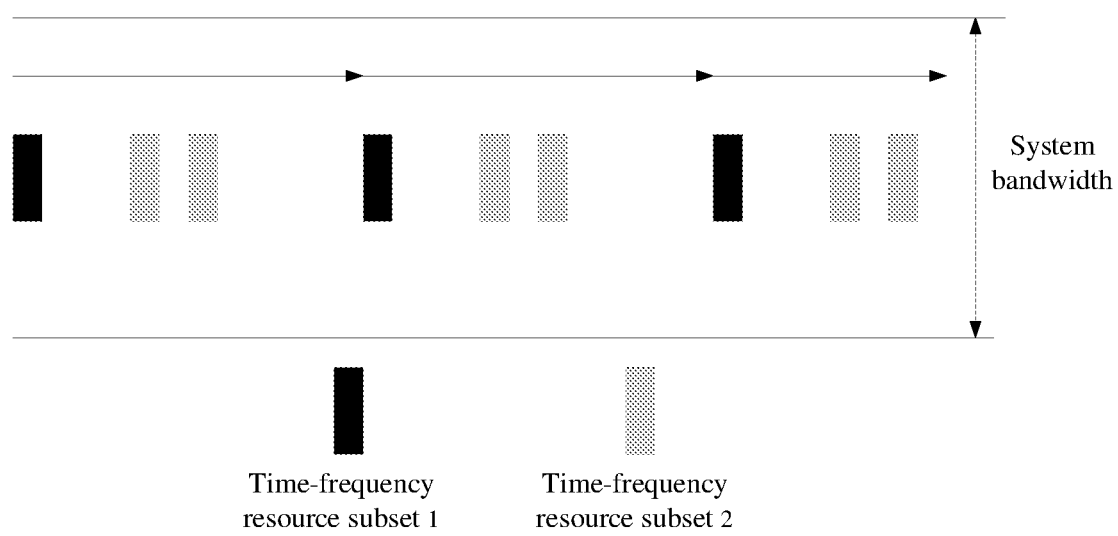
FIG. 6 is a schematic diagram illustrating a time-frequency resource subset, according to an exemplary embodiment.

(5-1) The second specified signal is broadcast by use of the first time-frequency resource subset and the second time-frequency resource subset. As shown in FIG. 6, the specified time-frequency resource includes a time-frequency resource subset 1 and a time-frequency resource subset 2. A second-type V2X (for example, NR V2X) synchronization signal and/or broadcast message transmitted on the time-frequency resource subset 1 are/is the same as those/that for first-type V2X (for example, LTE V2X), and a second-type V2X (for example, NR V2X) synchronization signal and/or broadcast message transmitted on the time-frequency resource subset 2 are/is different from those/that for first-type V2X (for example, LTE V2X). For example, different subcarrier spacings (SCSs) (30 KHz or 60 KHz) and different coding and decoding schemes (for example, polar codes) are employed, and the broadcast messages include different bit information fields.

In an embodiment, if the second specified signal includes a second-type V2X (for example, NR V2X) broadcast message, operation (5-1) may include the following operations.

(6-1) The second-type V2X broadcast message is divided into a first information subset and a second information subset, where the first information subset represents information that can be carried in a physical sidelink broadcast channel (PSBCH) in the first time-frequency resource subset, and the second information subset represents information that cannot be carried in the PSBCH in the first time-frequency resource subset.

(6-2) The first information subset is broadcast by use of the first time-frequency resource subset.

(6-3) The second information subset is broadcast by use of the second time-frequency resource subset.

The first time-frequency resource subset is used to transmit the second-type V2X (for example, NR V2X) synchronization signal and/or broadcast message compatible with the first-type V2X (for example, LTE V2X) synchronization signal and/or broadcast message. The second time-frequency resource subset is configured to transmit the second-type V2X (for example, NR V2X) synchronization signal and/or broadcast message incompatible with the first-type V2X (for example, LTE V2X) synchronization signal and/or broadcast message.

For example, the second-type V2X (for example, NR V2X) broadcast message may carry information about an Subcarrier Spacing (SCS), resource pool and the like, which are used by the first terminal to send the second-type V2X (for example, NR V2X) control signaling and/or data, and such information cannot be carried in the PSBCH in the first time-frequency resource subset, so that another second-type V2X (for example, NR V2X) user terminal, after receiving the synchronization signal and/or broadcast message sent on the first time-frequency resource subset, may also be required to receive the broadcast message on the second time-frequency resource subset to acquire a complete broadcast message.

In an embodiment, before (5-1) is executed, the following operations may further be included.

(7-1) A V2X type, to which the first device belongs, is determined, the V2X type including first-type V2X (for example, LTE V2X) or second-type V2X (for example, NR V2X).

In the embodiment of the present disclosure, the V2X type, to which the first device belongs, may be first-type V2X (for example, LTE V2X) or second-type V2X (for example, NR V2X).

(7-2) Indication information representing the V2X type is generated.

(7-3) The indication information is added to a specified position in the PSBCH in the first time-frequency resource subset.

In an embodiment, the specified position in (7-3) may be at a reserved bit(s) specified to indicate the V2X type in the PSBCH. That is, it may be indicated whether the sending terminal of the synchronization signal and/or broadcast message is an NR V2X terminal or an LTE V2X terminal by use of a reserved bit)s) in the PSBCH in the first time-frequency resource subset.

For example, the broadcast message transmitted in the PSBCH in the first time-frequency resource subset includes 27 reserved bits, and 1 bit therein may be used to indicate whether the sending terminal is an NR V2X terminal or an LTE V2X terminal. Meanwhile, a receiving terminal of the synchronization signal and/or broadcast message may determine whether the sending terminal is an NR V2X terminal or an LTE V2X terminal according to the specified position in the PSBCH in the first time-frequency resource subset and may further determine whether to receive the broadcast message on the second time-frequency resource subset.

It can be seen from the embodiment that the second specified signal to be broadcast is determined and the second specified signal is broadcast on the specified time-frequency resource, particularly, the first time-frequency resource subset in the specified time-frequency resource is used to transmit the second-type V2X (for example, NR V2X) synchronization signal and/or broadcast message compatible with the first-type V2X (for example, LTE V2X) synchronization signal and/or broadcast message, and the second time-frequency resource subset is used to transmit the second-type V2X (for example, NR V2X) synchronization signal and/or broadcast message incompatible with the first-type V2X (for example, LTE V2X) synchronization signal and/or broadcast message. Therefore, the reliability of second-type V2X (for example, NR V2X) direct communication is improved.

The present disclosure also provides an embodiment of a device for V2X synchronization which corresponds to the embodiment of the method for V2X synchronization.

Figure 7:
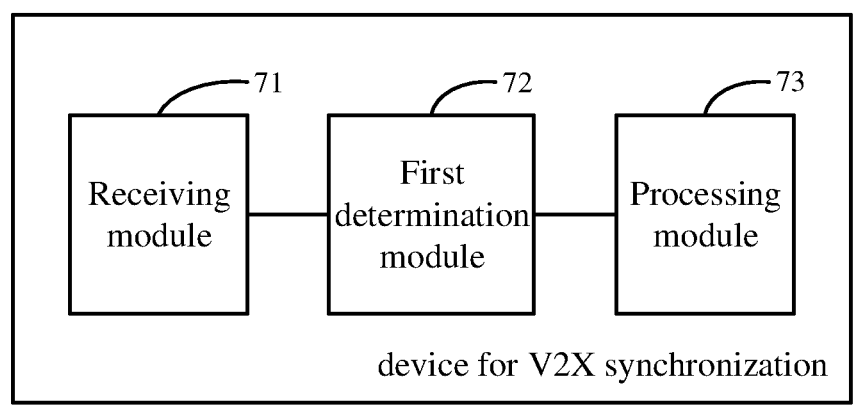
FIG. 7 is a block diagram of a transmission configuration device, according to an exemplary embodiment.

FIG. 7 is a block diagram of a device for V2X synchronization, according to an exemplary embodiment. The device for V2X synchronization may be applied to a first terminal. The first terminal supports both first-type V2X direct communication and second-type V2X direct communication. For example, a first type is an LTE cellular network, and a second type is an NR cellular network. The device is configured to execute the method for V2X synchronization shown in FIG. 1. As shown in FIG. 7, the device for V2X synchronization may include a receiving module 71, a first determination module 72, and a processing module 73.

The receiving module 71 is configured to receive at least one first synchronization signal. The at least one first synchronization signal includes one or more synchronization signals for first-type V2X direct communication and/or second-type V2X direct communication.

The first determination module 72 is configured to determine a synchronization reference signal for second-type V2X direct communication according to the first synchronization signal.

The processing module 73 is configured to perform second-type V2X direct communication according to the synchronization reference signal.

It can be seen from the embodiment that, when at least one first synchronization signal is received, the first synchronization signal being a synchronization signal for first-type V2X direct communication and/or second-type V2X direct communication, the synchronization reference signal for second-type V2X direct communication may be determined according to the first synchronization signal, and second-type V2X direct communication may be performed according to the synchronization reference signal, thereby enabling provision of a synchronization reference signal for communication of a network of one type by use of a synchronization signal of a network of another type, and improving the V2X synchronization efficiency.

In an embodiment, based on the device shown in FIG. 7, the at least one first synchronization signal includes at least one of:
a second synchronization signal representing a synchronization signal sent by a GNSS;
a third synchronization signal representing a downlink synchronization signal sent by a first-type base station;
a fourth synchronization signal representing a synchronization signal for first-type V2X direct communication sent by a second terminal;
a fifth synchronization signal representing a downlink synchronization signal sent by a second-type base station; or
a sixth synchronization signal representing a synchronization signal for second-type V2X direct communication sent by a third terminal.

Figure 8:
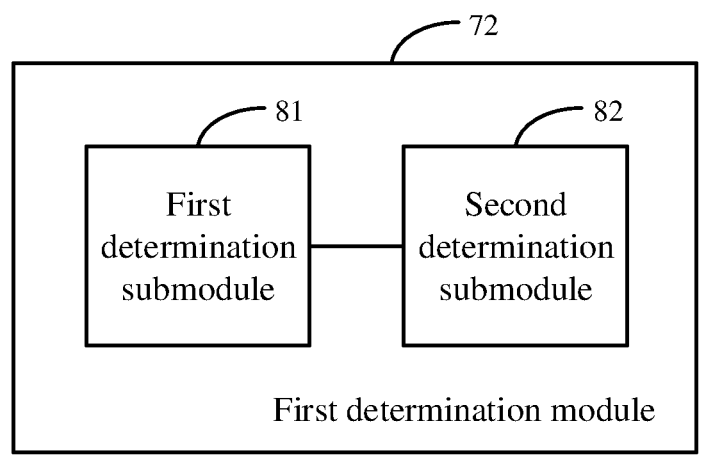
FIG. 8 is a block diagram of another transmission configuration device, according to an exemplary embodiment.

In an embodiment, based on the device shown in FIG. 7, as shown in FIG. 8, the first determination module 72 includes a first determination submodule 81 and a second determination submodule 82.

The first determination submodule 81 is configured to, if the at least one first synchronization signal consists of one first synchronization signal, determine the first synchronization signal to be the synchronization reference signal.

The second determination submodule 82 is configured to, if the at least one first synchronization signal consists of multiple first synchronization signals, determine the synchronization reference signal from the first synchronization signals according to a first set rule.

It can be seen from the embodiment that, if the number of the first synchronization signal is one, the first synchronization signal may be directly determined to be the synchronization reference signal, and if the number of the first synchronization signal is multiple, the synchronization reference signal may be determined from the first synchronization signals according to the first set rule. Therefore, the accuracy of determining the synchronization reference signal is improved.

Figure 9:
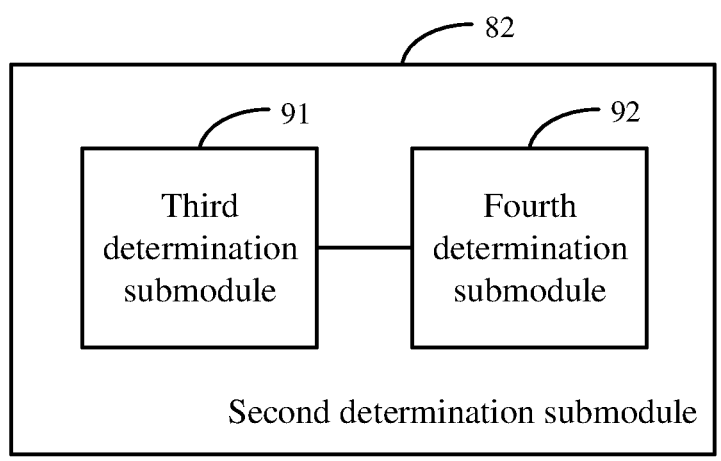
FIG. 9 is a block diagram of another transmission configuration device, according to an exemplary embodiment.

In an embodiment, based on the device shown in FIG. 8, as shown in FIG. 9, the first set rule includes a specified priority order corresponding to specified synchronization signals; and the second determination submodule 82 includes a third determination submodule 91 and a fourth determination submodule 92.

The third determination submodule 91 is configured to determine a first priority order corresponding to the first synchronization signal according to the specified priority order.

The fourth determination submodule 92 is configured to determine one of the first synchronization signals corresponding to a highest priority in the first priority order to be the synchronization reference signal.

Figure 10:
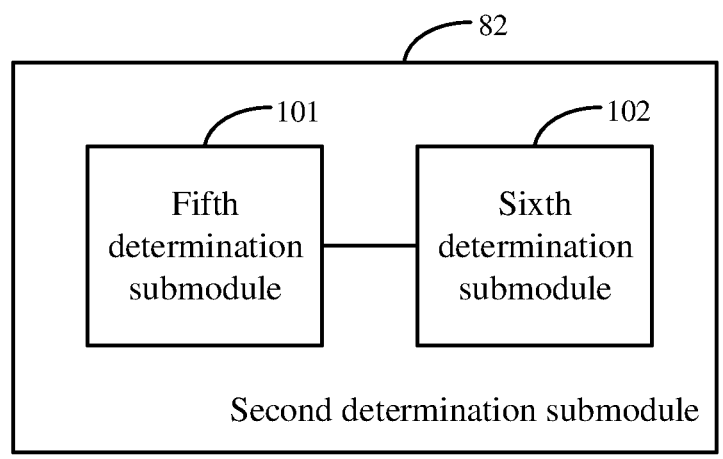
FIG. 10 is a block diagram of another transmission configuration device, according to an exemplary embodiment.

In an embodiment, based on the device shown in FIG. 8, as shown in FIG. 10, the first set rule includes a first set priority order and second set priority order corresponding to the specified synchronization signals, a first set condition corresponding to the first set priority order and a second set condition corresponding to the second set priority order. The second determination submodule 82 includes a fifth determination submodule 101 and a sixth determination submodule 102.

The fifth determination submodule 101 is configured to, if it is detected that the first set condition is met, determine a second priority order corresponding to the first synchronization signal according to the first set priority order and determine one of the first synchronization signals corresponding to a highest priority in the second priority order to be the synchronization reference signal.

The sixth determination submodule 102 is configured to, if it is detected that the second set condition is met, determine a third priority order corresponding to the first synchronization signal according to the second set priority order and determine one of the first synchronization signals corresponding to a highest priority in the third priority order to be the synchronization reference signal.

In an embodiment, based on the device shown in FIG. 10, the first set condition includes that the first terminal is out of a coverage of a base station or that the first terminal is out of the coverage of the base station and the base station instructs the first terminal through downlink control signaling to use the first set priority order; and the second set condition includes that the first terminal is in the coverage of the base station and the base station instructs the first terminal through the downlink control signaling to use the second set priority order.

Figure 11:
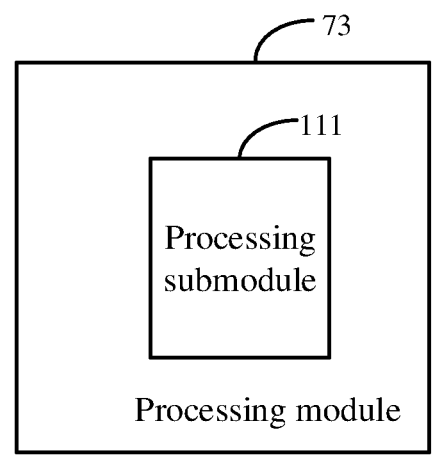
FIG. 11 is a block diagram of another transmission configuration device, according to an exemplary embodiment.

In an embodiment, based on the device shown in FIG. 7, as shown in FIG. 11, the processing module 73 includes a processing submodule 111.

The processing submodule 111 is configured to send second-type V2X control signaling and/or data according to the synchronization reference signal.

Figure 12:
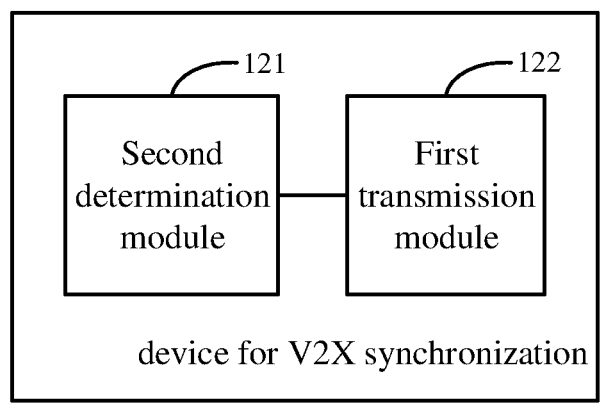
FIG. 12 is a block diagram of another transmission configuration device, according to an exemplary embodiment.

In an embodiment, based on the device shown in FIG. 7, as shown in FIG. 12, the device further includes a second determination module 121 and a first transmission module 122.

The second determination module 121 is configured to determine a first specified signal to be broadcast according to a second set rule, the specified signal including a first signal and/or a second signal, wherein the first signal includes a first-type V2X synchronization signal and/or broadcast message, and the second signal includes a second-type V2X synchronization signal and/or broadcast message.

The first transmission module 122 is configured to broadcast the first specified signal.

It can be seen from the embodiment that the first specified signal to be broadcast may be determined according to the second set rule, such that the first terminal may merely send a first-type V2X (for example, LTE V2X) synchronization signal and/or broadcast message according to the second set rule, or may merely send a second-type V2X (for example, NR V2X) synchronization signal and/or broadcast message according to the second set rule, or may send both a first-type V2X (for example, LTE V2X) synchronization signal and/or broadcast message and a second-type V2X (for example, NR V2X) synchronization signal and/or broadcast message according to the second set rule. Therefore, the flexibility in V2X synchronization is improved, and the practicability of V2X synchronization is also improved.

In an embodiment, based on the device shown in FIG. 12, the second set rule is pre-configured by the first terminal, or may be indicated by the base station through the downlink control signaling to be used by the first terminal.

Figure 13:
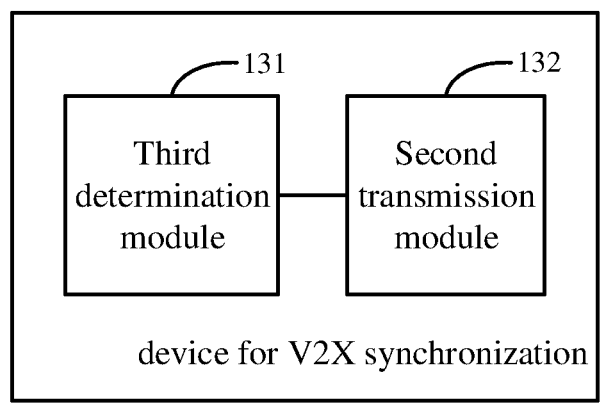
FIG. 13 is a block diagram of another transmission configuration device, according to an exemplary embodiment.

In an embodiment, based on the device shown in FIG. 7, as shown in FIG. 13, the device further includes a third determination module 131 and a second transmission module 132.

The third determination module 131 is configured to determine a second specified signal to be broadcast, the second specified signal including a third signal and/or a fourth signal. The third signal includes a second-type V2X synchronization signal and/or broadcast message compatible with the first-type V2X synchronization signal and/or broadcast message, and the fourth signal includes a second-type V2X synchronization signal and/or broadcast message incompatible with the first-type V2X synchronization signal and/or broadcast message; and The second transmission module 132 is configured to broadcast the second specified signal on a specified time-frequency resource.

It can be seen from the embodiment that the second specified signal to be broadcast is determined and the second specified signal is broadcast on the specified time-frequency resource, particularly the first time-frequency resource subset in the specified time-frequency resource is used to transmit the second-type V2X (for example, NR V2X) synchronization signal and/or broadcast message compatible with the first-type V2X (for example, LTE V2X) synchronization signal and/or broadcast message and the second time-frequency resource subset is used to transmit the second-type V2X (for example, NR V2X) synchronization signal and/or broadcast message incompatible with the first-type V2X (for example, LTE V2X) synchronization signal and/or broadcast message. Therefore, the reliability of second-type V2X (for example, NR V2X) direct communication is improved.

Figure 14:
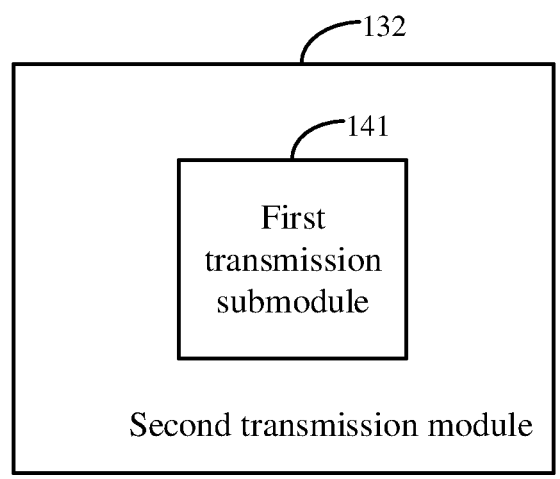
FIG. 14 is a block diagram of another transmission configuration device, according to an exemplary embodiment.

In an embodiment, based on the device shown in FIG. 13, as shown in FIG. 14, the specified time-frequency resource includes a first time-frequency resource subset and a second time-frequency resource subset, wherein the first time-frequency resource subset includes a time-frequency resource for transmitting the third signal, and the second time-frequency resource subset includes a time-frequency resource for transmitting the fourth signal; and the second transmission module 132 includes a first transmission submodule 141.

The first transmission submodule 141 is configured to broadcast the second specified signal by use of the first time-frequency resource subset and the second time-frequency resource subset.

Figure 15:
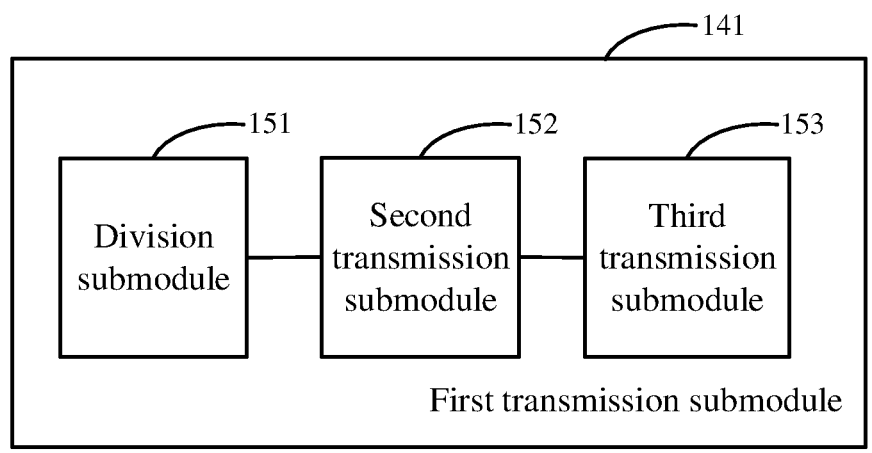
FIG. 15 is a block diagram of another transmission configuration device, according to an exemplary embodiment.

In an embodiment, based on the device shown in FIG. 14, as shown in FIG. 15, the second specified signal includes a second-type V2X broadcast message; and the first transmission submodule 141 includes a division submodule 151, a second transmission submodule 152, and a third transmission submodule 153.

The division submodule 151 is configured to divide the second-type V2X broadcast message into a first information subset and a second information subset. The first information subset represents information that can be carried in a PSBCH in the first time-frequency resource subset, and the second information subset represents information that cannot be carried in the PSBCH in the first time-frequency resource subset.

The second transmission submodule 152 is configured to broadcast the first information subset by use of the first time-frequency resource subset.

The third transmission submodule 153 is configured to broadcast the second information subset by use of the second time-frequency resource subset.

Figure 16:
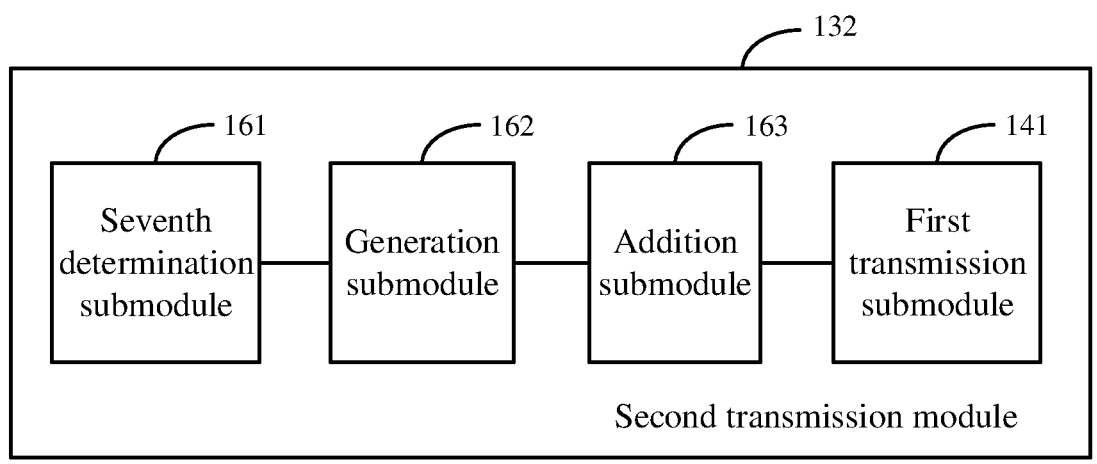
FIG. 16 is a block diagram of another transmission configuration device, according to an exemplary embodiment.

In an embodiment, based on the device shown in FIG. 14, as shown in FIG. 16, the second transmission module 132 further includes a seventh determination submodule 161, a generation submodule 162, and an addition submodule 163.

The seventh determination submodule 161 is configured to determine a V2X type, to which the first device belongs, the V2X type including first-type V2X or second-type V2X.

The generation submodule 162 is configured to generate indication information. The indication information is configured to represents the V2X type.

The addition submodule 163 is configured to add the indication information to a specified position in the PSBCH in the first time-frequency resource subset.

In an embodiment, based on the device shown in FIG. 16, the specified position is at a reserved bit specified to indicate the V2X type in the PSBCH.

In an embodiment, based on the device shown in any one of FIG. 7 to FIG. 16, the device is characterized in that a first type is an LTE cellular network and a second type is an NR cellular network.

The device embodiment substantially corresponds to the method embodiment, and thus for the related parts, part of descriptions of the method embodiment may be referred to. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure also provides a non-transitory computer-readable storage medium, in which a computer program is stored and which is characterized in that the computer program is configured to execute any method for V2X synchronization shown in FIG. 1 to FIG. 6.

The present disclosure also provides a device for V2X synchronization, which is applied to a first terminal, the first terminal supports both first-type V2X direct communication and second-type V2X direct communication, the device including:
  a processor; and
  a memory configured to store an instruction executable by the processor,
  wherein the processor is configured to:
    receive at least one first synchronization signal, the at least one first synchronization signal includes one or more synchronization signals for first-type V2X direct communication and/or second-type V2X direct communication;
    determine a synchronization reference signal for second-type V2X direct communication according to the first synchronization signal; and
    perform second-type V2X direct communication according to the synchronization reference signal.

Figure 17:
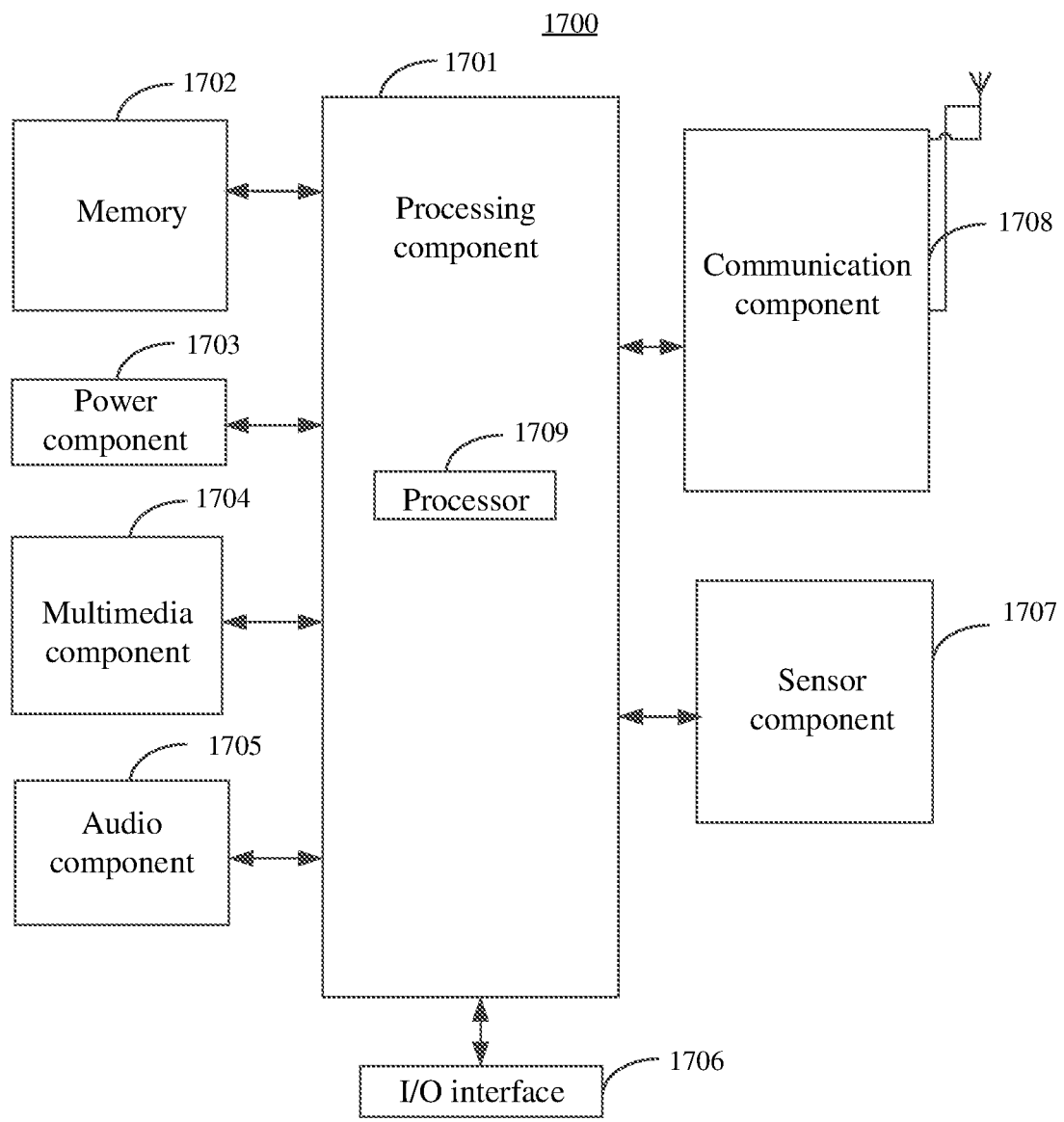
FIG. 17 is a structure diagram of a transmission configuration device, according to an exemplary embodiment.

FIG. 17 is a structure diagram of a device for V2X synchronization, according to an exemplary embodiment. FIG. 17 illustrates a device for V2X synchronization 1700 according to an exemplary embodiment. The device 1700 may be a terminal such as a computer, a mobile phone, a digital broadcast terminal, a messaging device, a gaming console, a tablet, a medical device, exercise equipment and a personal digital assistant.

Referring to FIG. 17, the device 1700 may include one or more of the following components: a processing component 1701, a memory 1702, a power component 1703, a multimedia component 1704, an audio component 1705, an Input/Output (I/O) interface 1706, a sensor component 1707, and a communication component 1708.

The processing component 1701 typically controls overall operations of the device 1700, such as the operations associated with display, telephone calls, data communications, camera operations, and recording operations. The processing component 1701 may include one or more processors 1709 to execute instructions to perform all or part of the steps in the abovementioned method. Moreover, the processing component 1701 may include one or more modules which facilitate interaction between the processing component 1701 and the other components. For instance, the processing component 1701 may include a multimedia module to facilitate interaction between the multimedia component 1704 and the processing component 1701.

The memory 1702 is configured to store various types of data to support the operation of the device 1700. Examples of such data include instructions for any applications or methods operated on the device 1700, contact data, phonebook data, messages, pictures, video, etc. The memory 1702 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1703 provides power for various components of the device 1700. The power component 1703 may include a power management system, one or more power supplies, and other components associated with generation, management and distribution of power for the device 1700.

The multimedia component 1704 includes a screen providing an output interface between the device 1700 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1704 includes a front camera and/or a rear camera. The front camera and/or the rear camera may receive external multimedia data when the device 1700 is in an operation mode, such as a photographing mode or a video mode. Each of the front camera and the rear camera may be a fixed optical lens system or have focusing and optical zooming capabilities.

The audio component 1705 is configured to output and/or input an audio signal. For example, the audio component 1705 includes a Microphone (MIC), and the MIC is configured to receive an external audio signal when the device 1700 is in the operation mode, such as a call mode, a recording mode and a voice recognition mode. The received audio signal may further be stored in the memory 1702 or sent through the communication component 1708. In some embodiments, the audio component 1705 further includes a speaker configured to output the audio signal.

The I/O interface 1706 provides an interface between the processing component 1701 and a peripheral interface module, and the peripheral interface module may be a keyboard, a click wheel, a button and the like. The button may include, but not limited to: a home button, a volume button, a starting button and a locking button.

The sensor component 1707 includes one or more sensors configured to provide status assessment in various aspects for the device 1700. For instance, the sensor component 1707 may detect an on/off status of the device 1700 and relative positioning of components, such as a display and small keyboard of the device 1700, and the sensor component 1707 may further detect a change in a position of the device 1700 or a component of the device 1700, presence or absence of contact between the user and the device 1700, orientation or acceleration/deceleration of the device 1700 and a change in temperature of the device 1700. The sensor component 1707 may include a proximity sensor configured to detect presence of an object nearby without any physical contact. The sensor component 1707 may also include a light sensor, such as a Complementary Metal Oxide Semiconductor (CMOS) or Charge Coupled Device (CCD) image sensor, configured for use in an imaging application. In some embodiments, the sensor component 1707 may also include an acceleration sensor, a gyroscope sensor, a magnetic sensor, a pressure sensor or a temperature sensor.

The communication component 1708 is configured to facilitate wired or wireless communication between the device 1700 and another device. The device 1700 may access a communication-standard-based wireless network, such as a Wireless Fidelity (WiFi) network, a 2nd-Generation (2G) or 3rd-Generation (3G) network or a combination thereof. In an exemplary embodiment, the communication component 1708 receives a broadcast signal or broadcast associated information from an external broadcast management system through a broadcast channel. In an exemplary embodiment, the communication component 1708 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 1702 including an instruction, and the instruction may be executed by the processor 1709 of the device 1700 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

When the instruction in the storage medium is executed by the processor, the device 1700 may execute any method for V2X synchronization.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for vehicle-to-everything (V2X) synchronization, applied to a first terminal, the first terminal supporting both first-type V2X direct communication in a long term evolution (LTE) cellular network and second-type V2X direct communication in a new radio (NR) cellular network, the method comprising:
receiving at least one first synchronization signal, wherein the at least one first synchronization signal comprises one or more synchronization signals for the first-type V2X direct communication, wherein the one or more synchronization signals comprise a second synchronization signal representing a downlink synchronization signal sent by a first-type base station, and the first-type base station is a base station of the LTE cellular network;
determining a synchronization reference signal for the second-type V2X direct communication according to the at least one first synchronization signal; and
performing the second-type V2X direct communication according to the synchronization reference signal.

2. The method of claim 1, wherein the at least one first synchronization signal further comprises at least one of:
a third synchronization signal representing a synchronization signal sent by a global navigation satellite system (GNSS);
or
a fourth synchronization signal representing a synchronization signal for second-type V2X direct communication sent by a second terminal.

3. The method of claim 1, wherein determining the synchronization reference signal for the second-type V2X direct communication according to the at least one first synchronization signal comprises:
in response to the at least one first synchronization signal consisting of one first synchronization signal, determining the first synchronization signal to be the synchronization reference signal; and
in response to the at least one first synchronization signal consisting of multiple first synchronization signals, determining the synchronization reference signal from the first synchronization signals according to a first set rule.

4. The method of claim 3, wherein the first set rule comprises a specified priority order corresponding to specified synchronization signals; and
wherein determining the synchronization reference signal from the first synchronization signals according to the first set rule comprises:
determining a priority order corresponding to the first synchronization signals according to the specified priority order, and
determining one of the first synchronization signals corresponding to a highest priority in the determined priority order to be the synchronization reference signal.

5. The method of claim 3, wherein the first set rule comprises a first set priority order and a second set priority order corresponding to specified synchronization signals, a first set condition corresponding to the first set priority order and a second set condition corresponding to the second set priority order, and
wherein determining the synchronization reference signal from the first synchronization signals according to the first set rule comprises:
in response to detecting that the first set condition is met, determining a first priority order corresponding to the first synchronization signal according to the first set priority order, and determining one of the first synchronization signals corresponding to a highest priority in the determined first priority order to be the synchronization reference signal; and
in response to detecting that the second set condition is met, determining a second priority order corresponding to the first synchronization signal according to the second set priority order, and determining one of the first synchronization signals corresponding to a highest priority in the determined second priority order to be the synchronization reference signal.

6. The method of claim 5, wherein the first set condition comprises that the first terminal is out of a coverage of a base station or that the first terminal is out of the coverage of the base station and the base station instructs the first terminal through downlink control signaling to use the first set priority order; and
the second set condition comprises that the first terminal is in the coverage of the base station and the base station instructs the first terminal through the downlink control signaling to use the second set priority order.

7. The method of claim 1, wherein performing the second-type V2X direct communication according to the synchronization reference signal comprises:
sending at least one of second-type V2X control signaling or data according to the synchronization reference signal.

8. The method of claim 1, further comprising:
determining a specified signal to be broadcast according to a second set rule, the specified signal comprising at least one of a first signal or a second signal, wherein the first signal comprises a first-type V2X synchronization signal and/or broadcast message, and the second signal comprises a second-type V2X synchronization signal and/or broadcast message; and
broadcast the specified signal.

9. The method of claim 8, wherein the second set rule is pre-configured by the first terminal, or
the second set rule is indicated by the base station through the downlink control signaling to be used by the first terminal.

10. The method of claim 1, further comprising:
determining a specified signal to be broadcast, the specified signal comprising at least one of a first signal or a second signal, wherein the first signal comprises a second-type V2X synchronization signal and/or broadcast message compatible with the first-type V2X synchronization signal and/or broadcast message, and the second signal comprises a second-type V2X synchronization signal and/or broadcast message incompatible with the first-type V2X synchronization signal and/or broadcast message; and
broadcasting the specified signal on a specified time-frequency resource.

11. The method of claim 10, wherein the specified time-frequency resource comprises a first time-frequency resource subset and a second time-frequency resource subset, wherein the first time-frequency resource subset comprises a time-frequency resource for transmitting the first signal, and the second time-frequency resource subset comprises a time-frequency resource for transmitting the second signal; and
wherein broadcasting the specified signal on the specified time-frequency resource comprises:
broadcasting the specified signal by use of the first time-frequency resource subset and the second time-frequency resource subset.

12. The method of claim 11, wherein the specified signal comprises a second-type V2X broadcast message, and
wherein broadcasting the specified signal by use of the first time-frequency resource subset and the second time-frequency resource subset comprises:
dividing the second-type V2X broadcast message into a first information subset and a second information subset, wherein the first information subset represents information that can be carried in a physical sidelink broadcast channel (PSBCH) in the first time-frequency resource subset, and the second information subset represents information that cannot be carried in the PSBCH in the first time-frequency resource subset;
broadcasting the first information subset by use of the first time-frequency resource subset; and
broadcasting the second information subset by use of the second time-frequency resource subset.

13. The method of claim 12, wherein before broadcasting the specified signal by use of the first time-frequency resource subset and the second time-frequency resource subset, the method further comprises:
determining a V2X type, to which the first terminal belongs, the V2X type comprising first-type V2X or second-type V2X;
generating indication information, the indication information representing the V2X type; and
adding the indication information to a specified position in the PSBCH in the first time-frequency resource subset.

14. The method of claim 13, wherein the specified position is at a reserved bit specified to indicate the V2X type in the PSBCH.

15. A first terminal, the first terminal being capable of simultaneously supporting first-type vehicle-to-everything (V2X) direct communication in a long term evolution (LTE) cellular network and second-type V2X direct communication in a new radio (NR) cellular network, the first terminal comprising:
a processor;
a memory configured to store instructions executable by the processor,
wherein the processor is configured to:
receive at least one first synchronization signal, wherein the at least one first synchronization signal comprises one or more synchronization signals for the first-type V2X direct communication, wherein the one or more synchronization signals comprise a second synchronization signal representing a downlink synchronization signal sent by a first-type base station, and the first-type base station is a base station of the LTE cellular network;
determine a synchronization reference signal for the second-type V2X direct communication according to the at least one first synchronization signal; and
perform the second-type V2X direct communication according to the synchronization reference signal.

16. The first terminal of claim 15, wherein the at least one first synchronization signal further comprises at least one of:
a third synchronization signal representing a synchronization signal sent by a global navigation satellite system (GNSS);
or
a fourth synchronization signal representing a synchronization signal for second-type V2X direct communication sent by a second terminal.

17. The first terminal of claim 15, wherein in determining the synchronization reference signal for the second-type V2X direct communication according to the at least one first synchronization signal, the processor is further configured to:
in response to the at least one first synchronization signal consisting of one first synchronization signal, determine the first synchronization signal to be the synchronization reference signal; and
in response to the at least one first synchronization signal consisting of multiple first synchronization signals, determining the synchronization reference signal from the first synchronization signals according to a first set rule.

18. The first terminal of claim 17, wherein the first set rule comprises a specified priority order corresponding to specified synchronization signals; and in determining the synchronization reference signal from the first synchronization signals according to the first set rule, the processor is further configured to:
   determine a priority order corresponding to the first synchronization signals according to the specified priority order, and
   determine one of the first synchronization signals corresponding to a highest priority in the determined priority order to be the synchronization reference signal.

19. The first terminal of claim 17, wherein the first set rule comprises a first set priority order and a second set priority order corresponding to specified synchronization signals, a first set condition corresponding to the first set priority order and a second set condition corresponding to the second set priority order, and in determining the synchronization reference signal from the first synchronization signals according to the first set rule, the processor is further configured to:
   in response to detecting that the first set condition is met, determine a first priority order corresponding to the first synchronization signal according to the first set priority order, and determining one of the first synchronization signals corresponding to a highest priority in the determined first priority order to be the synchronization reference signal; and
   in response to detecting that the second set condition is met, determine a second priority order corresponding to the first synchronization signal according to the second set priority order, and determining one of the first synchronization signals corresponding to a highest priority in the determined second priority order to be the synchronization reference signal.

* * * * *